L. J. DAWDY.
Hand-Cultivators.
No. 136,220. Patented Feb. 25, 1873.
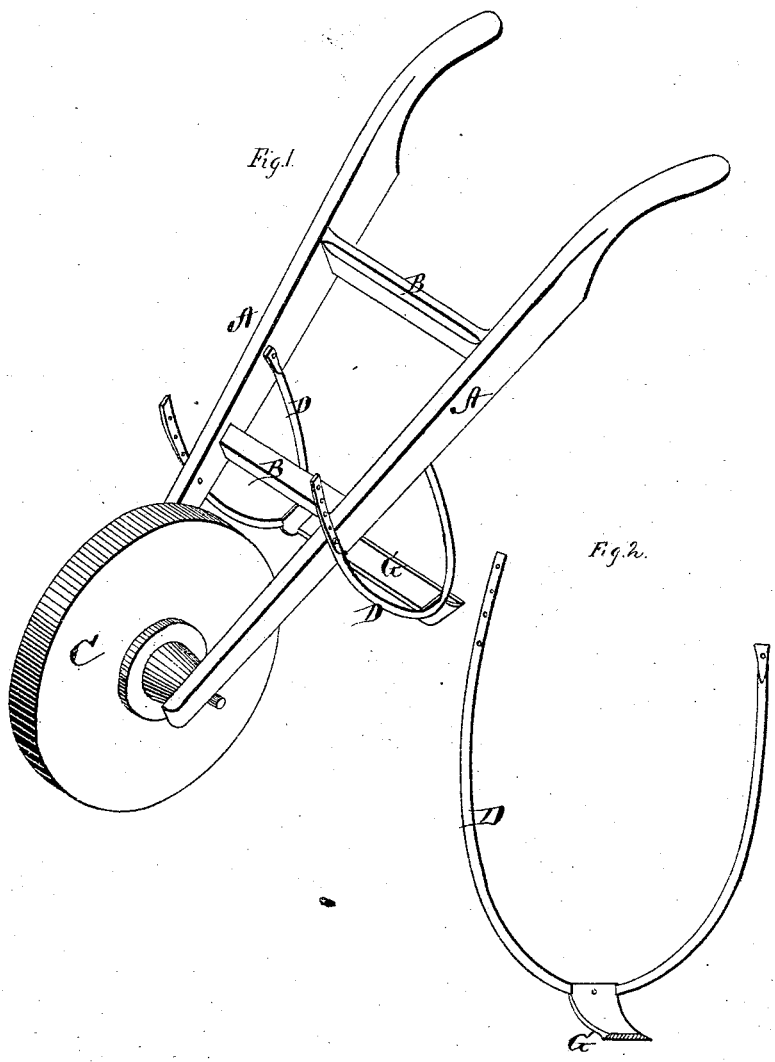
Witness:
Jas. E. Hutchinson
C. L. Evert
Inventor.
Lansing J. Dawdy.
per Alexander Mason
Attorneys.

UNITED STATES PATENT OFFICE.

LANSING J. DAWDY, OF HAMBURG, IOWA.

IMPROVEMENT IN HAND-CULTIVATORS.

Specification forming part of Letters Patent No. 136,220, dated February 25, 1873.

*To all whom it may concern:*

Be it known that I, LANSING J. DAWDY, of Hamburg, in the county of Fremont and in the State of Iowa, have invented certain new and useful Improvements in Hand-Cultivator; and do hereby declare that the following is a full, clear, and exact description thereof, reference being had to the accompanying drawing and to the letters of reference marked thereon making a part of this specification.

The nature of my invention consists in a hand-cultivator for weeding and cutting strawberry runners composed of a wheelbarrow-frame provided with a curved U-shaped rod pivoted to each handle, the rods being connected with a horizontal blade having its ends turned upward, and the forward ends of the rods being perforated to adjust at different heights to the handles, and thereby regulating the angle and depth that the blade shall act upon the soil; all as more fully hereinafter set forth.

In order to enable others skilled in the art to which my invention appertains to make and use the same, I will now proceed to describe its construction and operation, referring to the annexed drawing, in which—

Figure 1 is a perspective view of my machine, and Fig. 2 is a section of the cutting instrument and one of its supports.

A A represent two bars connected by cross-bars B B, forming the frame of my machine. The bars A A are not parallel with each other, but set so that at one end they form handles, while at the other they are only far enough apart to receive between them the wheel C. To the inner side of each side bar A is pivoted one end of a bent rod or bow, D, the other end of which is attached to the outer side of the side bar by a screw or other suitable fastening. At or near the center, in the bends of the bows D D, is attached the knife-blade G, which is sharpened on both edges, so that the back edge can be used where it is not always handy or convenient to get the front edge to the work.

This machine may be made of any size desired, and is to be used for cutting weeds in gardens and runners from strawberry plants.

The front ends of the bows D D are provided with a number of holes so that the knife may be raised and lowered at pleasure.

Having thus fully described my invention, what I claim as new, and desire to secure by Letters Patent, is—

The within-described garden implement, consisting of the frame A B, wheel C, knife G, and bows D D, pivoted at one end and perforated at the other end, by which means they are made adjustable, all substantially as set forth.

In testimony that I claim the foregoing I have hereunto set my hand this 24th day of October, 1872.

LANSING J. DAWDY.

Witnesses:
CHAS. C. DONALD,
W. G. READ.